United States Patent
Lindoff et al.

(10) Patent No.: US 8,724,751 B2
(45) Date of Patent: May 13, 2014

(54) METHOD FOR A SINGLE RADIO AGGREGATED SPECTRUM RECEIVER, COMPUTER PROGRAM, RECEIVER, AND TERMINAL

(75) Inventors: Bengt Lindoff, Bjärred (SE); Lars Sundström, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 605 days.

(21) Appl. No.: 12/992,029

(22) PCT Filed: May 12, 2009

(86) PCT No.: PCT/EP2009/055686
§ 371 (c)(1),
(2), (4) Date: Feb. 21, 2011

(87) PCT Pub. No.: WO2009/138385
PCT Pub. Date: Nov. 19, 2009

(65) Prior Publication Data
US 2011/0150122 A1      Jun. 23, 2011

Related U.S. Application Data

(60) Provisional application No. 61/055,526, filed on May 23, 2008.

(30) Foreign Application Priority Data

May 16, 2008   (EP) ..................................... 08009085

(51) Int. Cl.
*H04B 1/10*       (2006.01)
(52) U.S. Cl.
USPC .......................................... 375/346; 375/350
(58) Field of Classification Search
USPC ......... 375/219, 285, 295, 316, 346, 358, 377, 375/350; 370/310, 328–330; 455/450, 455/452.1, 452.2
See application file for complete search history.

(56) References Cited

U.S. PATENT DOCUMENTS

| | | | |
|---|---|---|---|
| 5,602,847 A | 2/1997 | Pagano et al. | |
| 5,655,217 A * | 8/1997 | Lemson | ........................ 455/513 |

(Continued)

FOREIGN PATENT DOCUMENTS

| | | |
|---|---|---|
| CN | 1173101 A | 2/1998 |
| EP | 0 812 069 A2 | 12/1997 |

(Continued)

OTHER PUBLICATIONS

PCT International Search Report, dated Aug. 12, 2009, in connection with International Application No. PCT/EP2009/055686.

(Continued)

*Primary Examiner* — Tesfaldet Bocure
(74) *Attorney, Agent, or Firm* — Potomac Patent Group PLLC

(57) ABSTRACT

A method for a single radio aggregated spectrum receiver of a terminal arranged to operate in a radio network is disclosed. The method comprises receiving information from a network node of the radio network about frequency properties of an aggregated spectrum to be received; determining information about the aggregated spectrum comprising at least one of presence of blocking interferer(s) interspersed with, and pass bands within the aggregated spectrum; and providing filter(s) based on the determined information about the aggregated spectrum such that desired signals are passed and any blocking interferer(s) are attenuated. Corresponding computer program, receiver and terminal are also disclosed.

19 Claims, 7 Drawing Sheets

(56) References Cited

U.S. PATENT DOCUMENTS

| | | | |
|---|---|---|---|
| 6,704,378 B2* | 3/2004 | Jagger et al. | 375/346 |
| 7,454,175 B2* | 11/2008 | Karabinis | 455/73 |
| 2006/0039318 A1* | 2/2006 | Oh et al. | 370/328 |
| 2007/0115878 A1 | 5/2007 | Ashish et al. | |
| 2009/0285164 A1* | 11/2009 | Chin et al. | 370/329 |
| 2009/0285316 A1* | 11/2009 | Park et al. | 375/260 |

FOREIGN PATENT DOCUMENTS

| | | |
|---|---|---|
| EP | 1 750 466 A1 | 2/2007 |
| JP | 2001-285229 A | 10/2001 |
| JP | 2003-169017 A | 6/2003 |
| JP | 2007-300421 A | 11/2007 |
| WO | 2006/046307 A1 | 5/2006 |
| WO | 2007/083568 A1 | 7/2007 |
| WO | 2007/132977 A1 | 11/2007 |

OTHER PUBLICATIONS

International Preliminary Report on Patentability, dated Aug. 11, 2010, in connection with International Application No. PCT/EP2009/055686.

Akyildiz et al. "Next generation/dynamic spectrum access/cognitive radio wireless networks: A survey" Computer Networks, Elsevier Science Publishers B.V., Amsterdam, NL, vol. 50, No. 13, Sep. 15, 2006, pp. 2127-2159, XP005528671, ISSN: 1389-1286.

Adreani, P. et al. "A CMOS gm-C Polyphase Filter with High Image Band Rejection" Proceedings of the 26th European Solid-State Circuits Conference (ESSCIRC '00), pp. 244-247, Sep. 2000.

Japanese Office Action, mailed Oct. 11, 2013, in connection with Japanese Patent Application No. 2011-508886, all pages.

Translation of Japanese Office Action, mailed Oct. 11, 2013, in connection with Japanese Patent Application No. 2011-508886, all pages.

EP Article 94(3) Communication, dated Aug. 7, 2013, in connection with European Patent Application No. 08 009 085.5-1855, all pages.

Chinese Office Action, dated Feb. 20, 2013, in connection with Chinese Patent Application No. 200980118499.3.

Translation of Chinese Office Action, dated Feb. 20, 2013, in connection with Chinese Patent Application No. 200980118499.3.

Chinese Search Report, dated Feb. 4, 2013, in connection with Chinese Patent Application No. 200980118499.3.

Translation of Chinese Search Report, dated Feb. 4, 2013, in connection with Chinese Patent Application No. 200980118499.3.

Second Chinese Office Action, dated Dec. 3, 2013, in connection with counterpart Chinese Application No. 200980118499.3 (see translation below), all pages.

Translation of Chinese Office Action, dated Dec. 3, 2013, in connection with counterpart Chinese Application No. 200980118499.3, all pages.

* cited by examiner

METHOD FOR A SINGLE RADIO
AGGREGATED SPECTRUM RECEIVER,
COMPUTER PROGRAM, RECEIVER, AND
TERMINAL

CROSS-REFERENCE TO RELATED APPLICATIONS

This application claims priority under 35 U.S.C. §119 to European Patent Application No. 08009085.5, filed May 16, 2008, which is hereby incorporated herein by reference in its entirety. This application also claims the benefit of U.S. Provisional Application No. 61/055,526, filed May 23, 2008, which is hereby incorporated herein by reference in its entirety.

TECHNICAL FIELD

The present invention relates to a method for a single radio aggregated spectrum receiver, and a computer program for implementing the method, a single radio aggregated spectrum receiver, and a terminal utilizing such a receiver.

BACKGROUND

Radio networks which employ large bandwidths may face the problem, due to assignment of available frequencies to different use or users, of being forced to use non-contiguous spectrum, i.e. an aggregate of several sub-ranges in frequency, possibly interspersed with frequencies used by other users or systems. This can be coped with by using several receiving circuits for each frequency sub-range, each receiving circuit being adapted to receive signals in its frequency sub-range, to collect the aggregate signal. However, this increases complexity of the receiver.

U.S. Pat. No. 5,602,847 discloses an apparatus for digitizing an input signal having frequency components within several segregated frequency bands. A filtering arrangement for passing only frequency components of the input signal being within the several segregated frequency bands to attenuate spectral components within a frequency gap between the several segregated frequency bands. The input signal is digitized such that an output comprises a periodic overlapping spectrum, including the spectrum of the filtered signal at corresponding frequencies with a replica of the spectral components of one of the frequency components appearing in the frequency gap created by the filtering.

It is a desire to provide a modified approach for these types of radio signals.

SUMMARY

It is therefore an object to provide a reception approach. The invention is based on the understanding that a receiver operating in such a radio network can gain knowledge from the radio network on properties of an aggregate spectrum that is used for communication, i.e. on which parts in frequency of the spectrum where the desired signal is to be found. Furthermore, the receiver may also check if the gaps in the spectrum are occupied by interfering signals. The gained knowledge can be used by the receiver to adapt filters in a front end receiving circuit of the receiver to provide that any interferers are attenuated, and that only the desired signal is passed through to detection.

According to a first aspect of the present invention, there is provided a method for a single radio aggregated spectrum receiver of a terminal arranged to operate in a radio network, comprising receiving information from a network node of the radio network about frequency properties of an aggregated spectrum to be received; determining information about the aggregated spectrum comprising at least one of presence of blocking interferer(s) interspersed with, and pass bands within the aggregated spectrum; and providing filter(s) based on the determined information about the aggregated spectrum such that desired signals are passed and any blocking interferer(s) are attenuated.

Determining information about the aggregated spectrum may comprise estimating frequencies free from blocking interspersed interferers. Determining information about the aggregated spectrum may comprise receiving information about pass bands within the aggregated spectrum from the network node.

The providing of filters may comprise assigning a notch filter bank such that any blocking interferer(s) interspersed with the aggregated spectrum are attenuated.

The providing of filters may comprise assigning a pass band filter bank such that only desired signals of the aggregated spectrum is passed. The method may further comprise sending information to the network node about the pass bands and signal-to-interference ratio of the pass bands, such that communication between the terminal and the network node is enabled in the aggregated spectrum.

The determining of information about the aggregated spectrum and providing of filters based on the determined information may be updated regularly.

The filters may comprise complex filters. The complex filters may for example comprise at least one resonator for an in-phase signal component I; at least one resonator for a signal component in quadrature Q to the in-phase signal component; and a gyrator shared by I and Q signal paths. The method may here further comprise controlling frequency shift of impedance or admittance of the resonators by adjusting gain of amplifiers of the shared gyrator.

According to a second aspect, there is provided a computer program comprising computer executable instructions causing a processor, when executed thereon, to perform the steps according to the first aspect.

According to a third aspect, there is provided a single radio aggregated spectrum receiver for a terminal arranged to operate in a radio network. The receiver comprises a front end receiving circuit comprising programmable filters; and a control signal detector arranged to detect received information from a network node of the radio network about frequency properties of an aggregated spectrum to be received, and determine information about the aggregated spectrum comprising at least one of presence of blocking interferer(s) interspersed with, and pass bands within the aggregated spectrum, such that the programmable filters are set based on the determined information about the aggregated spectrum such that desired signals are passed and any blocking interferer(s) are attenuated.

The control signal detector may further be arranged to estimate frequencies free from blocking interspersed interferers such that information about the aggregated spectrum is determined.

The control signal detector may further be arranged to receive information about pass bands within the aggregated spectrum from the network node such that information about the aggregated spectrum is determined.

The programmable filters may be configured to a notch filter bank such that any blocking interferer(s) interspersed with the aggregated spectrum are attenuated.

The programmable filters may be configured to a pass band filter bank such that only desired signals of the aggregated spectrum is passed.

The receiver may further comprise a transmitter arranged to send information to the network node about the pass bands and signal-to-interference ratio of the pass bands, such that communication between the terminal and the network node is enabled in the aggregated spectrum.

The receiver may be arranged to determine information about the aggregated spectrum and update filters based on the determined information regularly.

The filters may comprise complex filters. The complex filters may for example comprise at least one resonator for an in-phase signal component I; at least one resonator for a signal component in quadrature Q to the in-phase signal component I; and a gyrator shared by I and Q signal paths. This implies that frequency shift of impedance or admittance of the resonators is controllable by adjusting gain of amplifiers of the shared gyrator.

According to a fourth aspect, there is provided a terminal for operation in a radio network, comprising a receiver according to the third aspect.

The terminal may be a mobile phone, a portable digital assistant, a laptop computer, or a digital camera.

DETAILED DESCRIPTION

Enabling the less complex single radio aggregated spectrum receiver (S-ASR) with acceptable reception characteristics is here provided by improved selectivity. The basic concept here disclosed is to apply a multitude of programmable notch filters to attenuate blocking interspersed interfering signals within the aggregated spectrum, or programmable pass-band filters to pass only the desired signals to subsequent receiving stages. The filters are preferably programmable with respect to center frequency $f_c$ and Q-value, or other parameters that relate to selectivity. An apparatus comprising and utilizing the receiver can preferably measure or retrieve by other means knowledge about the blocking interferers such that this information can be used to control properties of the notch filters, or the apparatus can preferably gain information on assigned sub-bands by receiving this information over any radio channel such that this information can be used to control properties of the pass-band filters. Thus, the receiver determines applicable information about the aggregated spectrum to be able to provide the filters to achieve the improved selectivity, wherein the filters are provided by programming the programmable filters.

Figure 1:
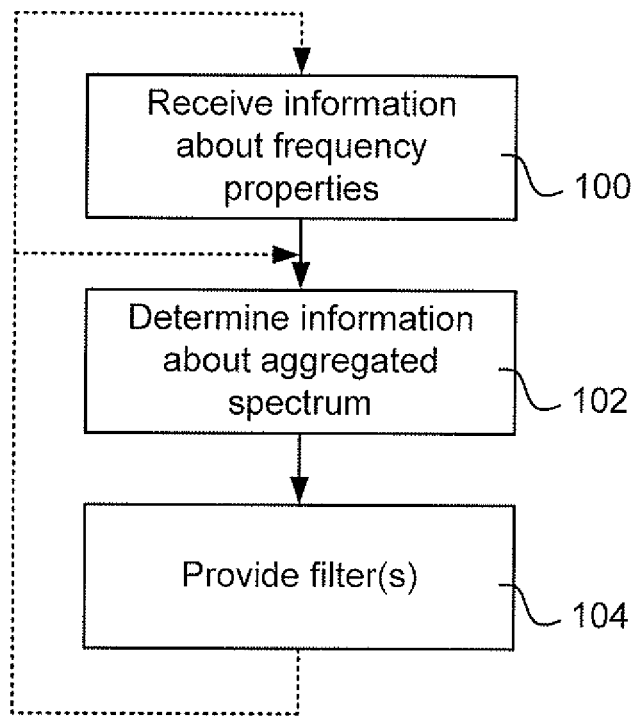
FIG. 1 is a flow chart illustrating a method according to an embodiment of the present invention.

This can be embodied as shown in FIG. 1, which is a flow chart illustrating a method according to an embodiment of the present invention. In a reception step 100, information about frequency properties of the aggregated spectrum is received from a network node of a radio network in which a terminal using the method operates. In an information determination step 102, information about the aggregated spectrum is determined, such as where the communication is about to take place within the aggregated spectrum, or positions where indication of presence of interspersed blocking interferers are found. Based on this gained knowledge, filters are provided in a filter provision step 104 to improve selectivity of the receiver. As indicated by the dotted arrow, the procedure can be repeated regularly to update the filters. Depending on which kind of change that has occurred for the aggregated spectrum, i.e. a different aggregated spectrum assigned by the radio network, or a different constellation of blocking interferers discovered by the receiver, the updating procedure can comprise a completely new set-up of the filters, or an adjustment, addition or removal of some of the filters, respectively, as indicated by the dotted arrows. The improved selectivity of the receiver will improve communication from the network node to the terminal.

Figure 2:
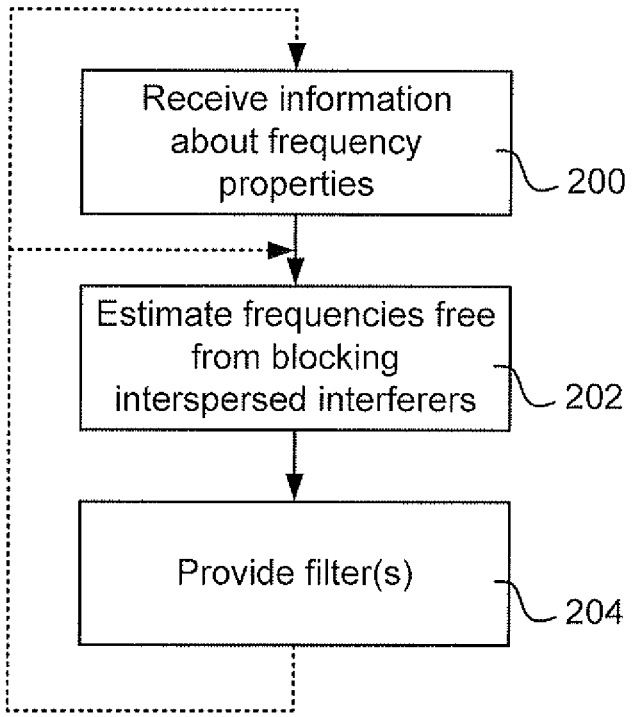
FIG. 2 is a flow chart illustrating a method according to an embodiment of the present invention.

This can also be embodied as shown in FIG. 2, which is a flow chart illustrating a method according to an embodiment of the present invention. In a reception step 200, information about frequency properties of the aggregated spectrum is received. In an estimation step 202, frequencies free from blocking interspersed interferers in the aggregated spectrum are determined. This can be performed by determining positions in the spectrum where the input signal is very high, which may indicate blocking interferers at these positions. The signal level can be estimated by measuring Received Signal Strength Indicator (RSSI) per certain sub-band, wherein the bandwidth of each sub-band can be for example 15 kHz, which corresponds to sub-carrier spacing in 3GPP LTE, or 200 kHz, which corresponds to a GSM bandwidth. This can also be performed by observing signal-to-interference ratio based on present reference signals, wherein the estimation preferably is performed in the digital domain. This latter implies that it can be distinguished between a blocking interferer producing a certain signal strength and a non-blocking interferer producing a similar signal strength. Based on the information about blocking interferers, analog front end filters for optimized blocking suppressions are adapted in a filter provision step 204. The network can be informed about which pass-bands to use in the communication between the network node and the terminal by transmitting this information from the terminal to the network node. This control information communication can, as the downlink control information about the frequency properties of the aggregated spectrum, be transmitted on a control signal carrier frequency, which can be narrow band, within or outside the aggregated spectrum. As indicated by the dotted arrows, the procedure can be repeated regularly to update the filters. The improved selectivity of the receiver will improve communication from the network node to the terminal.

One form of notch filter is a second order resonator, which is here used as a non-limiting example. A bank of resonators, each with the purpose of attenuating a blocking signal or a band of blocking signals, can be used. In this example, each notch filter is represented by a second order system defined by a resonant frequency $\omega_{0,k}$, and a quality factor $Q_k$. The transfer function of the filter k can be written as $$H_k(\omega) = C_k \left( \frac{1}{Q_k \omega_{0,k}} - \frac{j}{\omega} + \frac{j\omega}{\omega_{0,k}^2} \right)$$

where $C_k$ is a scaling factor.

A number of these notch filters can be placed arbitrarily in frequency to attenuate a specific set of blocking signals as desired. However, to better appreciate the properties of such a solution, it is better to investigate the case with a number of these notches placed equidistant in frequency and with a Q and C scaled to provide approximately the same bandwidth in Hz for all notches, i.e.

$$Q_k = k \cdot Q_t, C_k = Q_k \omega_{0,k}$$

where index k=1 represents the lowermost notch with respect to frequency.

The notches combined becomes $$H_{tot}(\omega) = \frac{1}{1/H_1(\omega) + 1/H_2(\omega) + \ldots + 1/H_N(\omega)}$$

Figure 3:
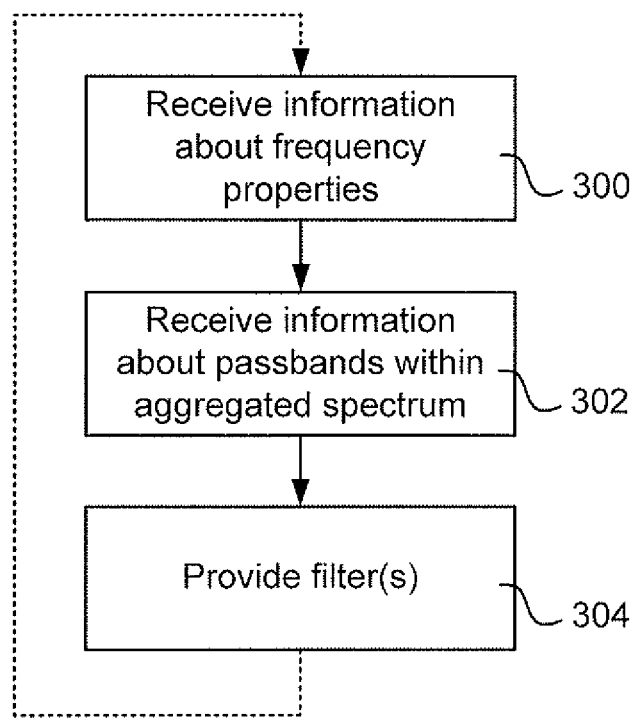
FIG. 3 is a flow chart illustrating a method according to an embodiment of the present invention.

The principle can also be embodied as shown in FIG. 3, which is a flow chart illustrating a method according to an embodiment of the present invention. In a reception step 300, information about frequency properties of the aggregated spectrum is received. In a further information reception step 302, information about pass bands within the aggregated spectrum is received. This can be performed by receiving the information from the network about where within the entire bandwidth of the aggregated spectrum the actual communication is to take place. Based on the information about the pass bands, analog front end filters for optimized pass band reception are adapted in a filter provision step 304. As indicated by the dotted arrow, the procedure can be repeated regularly to update the filters.

One form of pass band filter is a second order resonator, which is here used as a non-limiting example. A bank of resonators, each with the purpose of passing a desired signal or a band of desired signals, can be used. In this example, each band pass filter is represented by a second order system defined by a resonant frequency $\omega_{0,k}$, and a quality factor $Q_k$. The transfer function of the filter k can be written as $$H_k(\omega) = \frac{C_k}{\frac{1}{Q_k \omega_{0,k}} - \frac{j}{\omega} + \frac{j\omega}{\omega_{0,k}^2}}$$

where $C_k$ is a scaling factor.

A number of these pass band filters can be placed arbitrarily in frequency to pass a specific set of desired signals as desired. However, to better appreciate the properties of such a solution, it is better to investigate the case with a number of these notches placed equidistant in frequency and with a Q and C scaled to provide approximately the same bandwidth in Hz for all pass band filters, i.e.

$$Q_k = k \cdot Q_t, C_k = Q_k \omega_{0,k}$$

where index k=1 represents the lowermost pass band with respect to frequency.

The pass band filters combined becomes $$H_{tot}(\omega) = H_1(\omega) + H_2(\omega) + \ldots + H_N(\omega)$$

In a receiver applying an intermediate frequency, the filter bank needs to operate only on one single signal, and in a frequency around the intermediate frequency. In a receiver applying down-conversion of the received signal to baseband, the signal is represented by two baseband components, i.e. in-phase (I) and quadrature (Q). In this case there is provided two signal branches. As the full bandwidth is centered around a zero-frequency, i.e. direct current (DC), there need to be distinguished between negative and positive frequencies. Therefore, it might not be sufficient to have regular pass-band or notch filters operate directly on the I and Q components as this would result in an equal suppression of corresponding positive and negative frequencies. This can instead be coped with by using complex or poly-phase filters, as will be further described below.

An implementation of the filters can be RLC circuits, i.e. each RLC circuit implemented by resistors (R), inductors (L) and capacitors (C) in parallel or in series. Each resonator can be implemented as basic series or parallel RLC circuits. One example is a number of series connected parallel resonators acting as a load for a current source. Further an example is a voltage source driving a set of parallel-connected series resonators to generate a current output. Further an example is a number of shunt-connected series resonators acting as a load for a current source. Still further an example is a voltage source driving a set of series-connected parallel resonators to generate an output current.

Another implementation of the filters can be active resonators, which is particularly suitable for implementation in integrated circuits, where inductors with sufficient Q-value and inductance are less achievable, at least on reasonable chip areas. This is remedied by using gyrated capacitors for replacing the inductors.

When a receiver comprises several filters with a number of series connected parallel resonators acting as a load for a current source, each filter need to be designed to handle a worst case blocking scenario as most of the blocker current might need to pass through all the inductors implemented as gyrated capacitors. This applies to the case where the blocker frequency is lower than the lowermost resonance frequency of the filter bank. Here, no current consumption relaxation is possible for any of the filters. Similar for a voltage source driving a set of parallel-connected series resonators to generate a current output where the signal driving the filter bank now is defined as a voltage rather than as a current. The worst case now means that the frequency of a blocking signal is higher than any of the resonance frequencies and that means that the blocking signal voltage will appear over all inductors at the same time and consequently they all need to handle this voltage at the same time. Here, no voltage relaxation is possible for any of the filters. When the filter bank comprises several notches with a number of shunt-connected series resonators acting as a load for a current source, each notch need to be designed to handle a worst case blocking scenario as several blockers might be present at the same time. Similar applies for when a voltage source driving a set of series-connected parallel resonators to generate an output current, where the signal, now defined as a voltage rather than a current, drives the filter bank. Here, each notch need to be designed to handle the worst case blocking scenario as several blockers at maximum level might be present at the same time. These phenomena have impact on the current consumption. The reason for this is that the active circuit elements, such as amplifiers, in the gyrators must be able to provide the signal currents as discussed above, and therefore the DC current provided to the active circuit elements must be at least as large.

For each filter, a centre frequency need to be adjustable to be able to control the filters based on information about desired sub-bands and blocking interferers. One way is to implements capacitors as a bank of capacitors that can be switched in and out in discrete steps. Transconductance of any gyrator amplifiers can also be controlled to adjust inductance value of the resonators.

Figure 9:
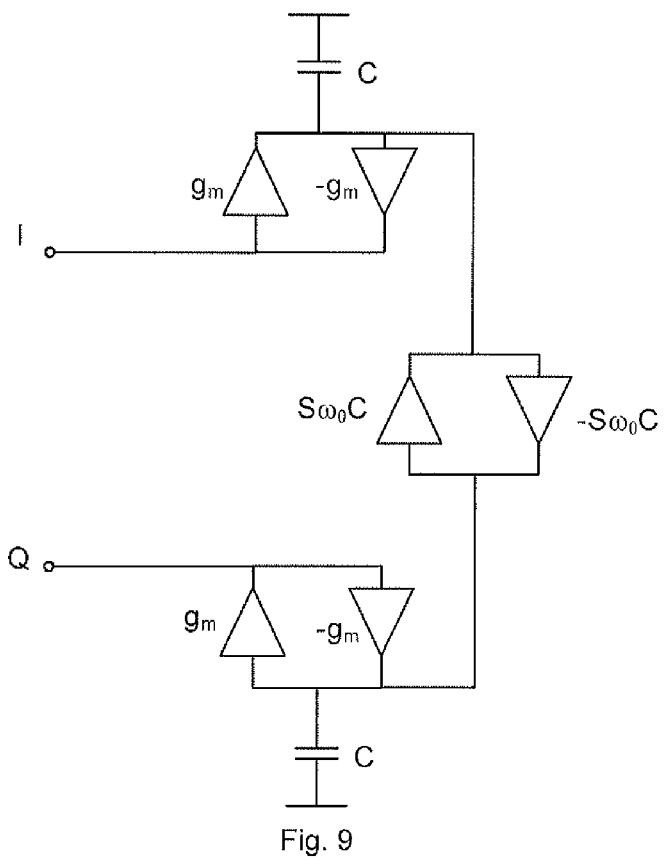
FIG. 9 illustrates a complex resonator comprising inductors implemented as gyrated capacitors.
Figure 10:
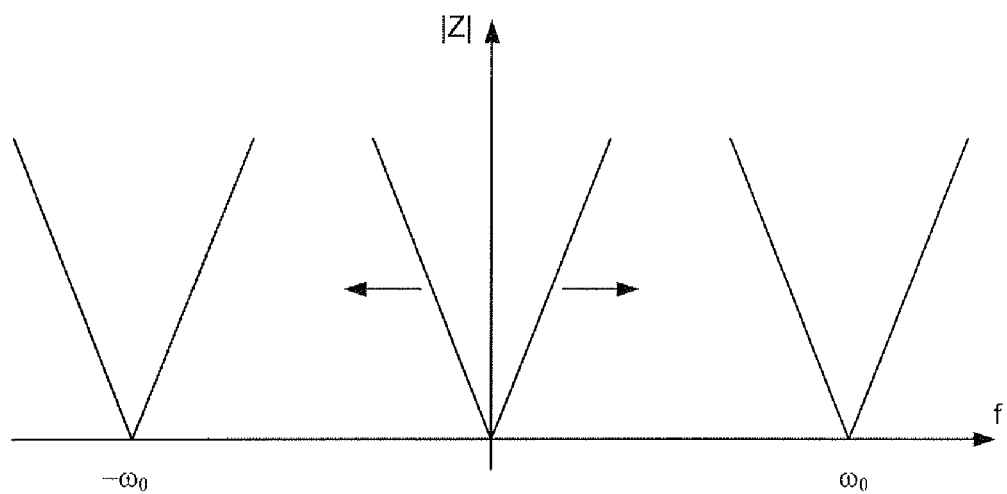
FIG. 10 illustrates a frequency shift in impedance associated with the complex resonator circuit illustrated in FIG. 9.
Figure 11:
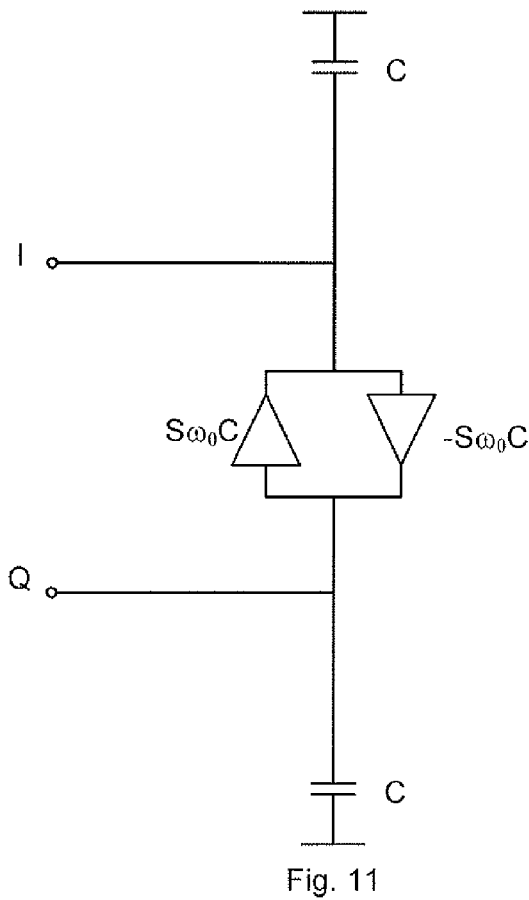
FIG. 11 illustrates a complex resonator with a similar structure as the one illustrated in FIG. 9, but here comprising capacitors.
Figure 12:
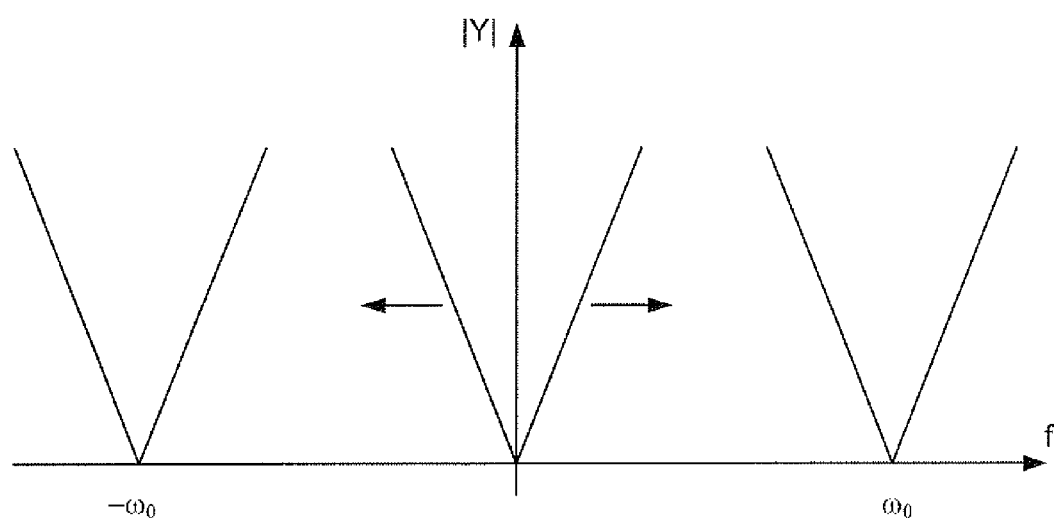
FIG. 12 illustrates the admittance of the resonator of FIG. 11.

Further another implementation of the filters can be complex filters, which rely on the existence of a signal down-converted into two components in quadrature, as described above. The quadrature relationship between the two components can be used to offset a low-pass filter response to an arbitrary centre frequency at the expense of doubled bandwidth. An example of a higher order filter is provided in Adreani, P. et al, "A CMOS gm-C Polyphase Filter with High Image Band Rejection", Proceedings of 26$^{th}$ European Solid-State Circuits Conference (ESSCIRC '00), pp. 244-247, September 2000. FIGS. 9 to 12 illustrates examples describing specific cases of an inductor, which is implemented as a gyrated capacitor, and a single capacitor, respectively, implemented as a complex filter through shifting of the resonance frequency, initially being equal to zero. A parameter S is used to control whether the filter should apply to negative or positive frequencies $-\omega_0$, $\omega_0$. The topology of the complex filters of FIGS. 9 and 11 has the same type of components as the resonators discussed above and can therefore be tuned in frequency in a similar way. FIG. 9 illustrates a complex resonator comprising inductors implemented as gyrated capacitors. FIG. 10 illustrates a frequency shift in impedance associated with the complex resonator circuit illustrated in FIG. 9. FIG. 11 illustrates a complex resonator with a similar structure as the one illustrated in FIG. 9, but here comprising capacitors. The admittance of the resonator of FIG. 11 will thus be as illustrated in FIG. 12, where associated frequency shift of admittance for the complex resonator circuit illustrated in FIG. 11. Thus, a single capacitor and inductor, implemented as a gyrated capacitor, respectively, implements a complex filter through shifting a resonance frequency, initially being zero as illustrated in FIGS. 10 and 12, where a parameter S, which is set to 1 or −1, is used to control whether the filter should apply to positive or negative frequencies $\omega_0$, $-\omega_0$. In presence of mismatch between I and Q signal paths, the single-side-band selectivity will be finite, but still higher than the selectivity determined by the order of the system and the Q-values of the components.

Figure 4:
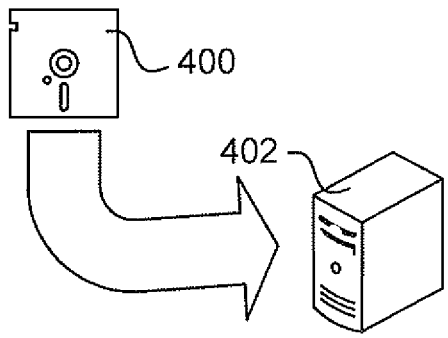
FIG. 4 schematically illustrates a computer readable medium for carrying a computer program.

The method according to the present invention is suitable for implementation with aid of processing means, such as computers and/or processors, as the operation of modern receivers highly rely on computerized signal processing in general, and the use of programmable filters in particular. Therefore, there is provided computer programs, comprising instructions arranged to cause the processing means, processor, or computer to perform the steps of any of the methods according to any of the embodiments described with reference to any of FIGS. 1 to 3, in a receiver. The computer programs preferably comprises program code which is stored on a computer readable medium 400, as illustrated in FIG. 4, which can be loaded and executed by a processing means, processor, or computer 402 to cause it to perform the methods, respectively, according to embodiments of the present invention, preferably as any of the embodiments described with reference to any of FIGS. 1 to 3. The computer 402 and computer program product 400 can be arranged to execute the program code sequentially where actions of the any of the methods are performed stepwise, but mostly be arranged to execute the program code on a real-time basis where actions of any of the methods are performed upon need and availability of data. The processing means, processor, or computer 402 is preferably what normally is referred to as an embedded system. Thus, the depicted computer readable medium 400 and computer 402 in FIG. 4 should be construed to be for illustrative purposes only to provide understanding of the principle, and not to be construed as any direct illustration of the elements.

Figure 5:
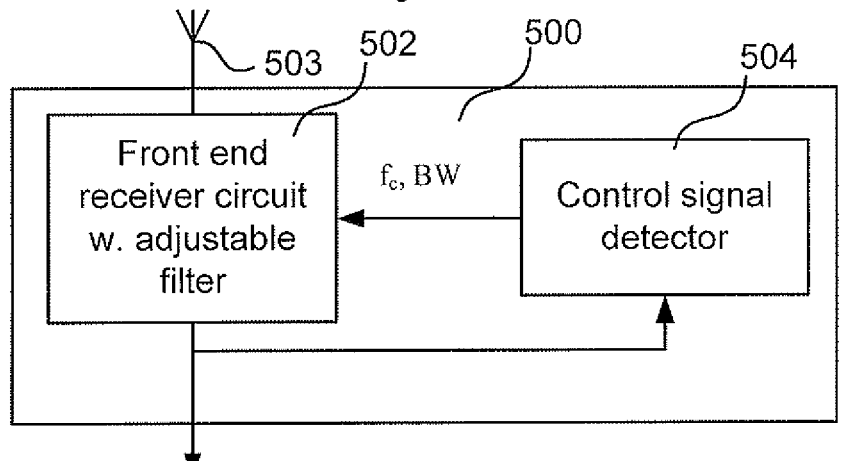
FIG. 5 is a very schematic block diagram illustrating a receiver according to embodiments of the present invention.
Figure 13:
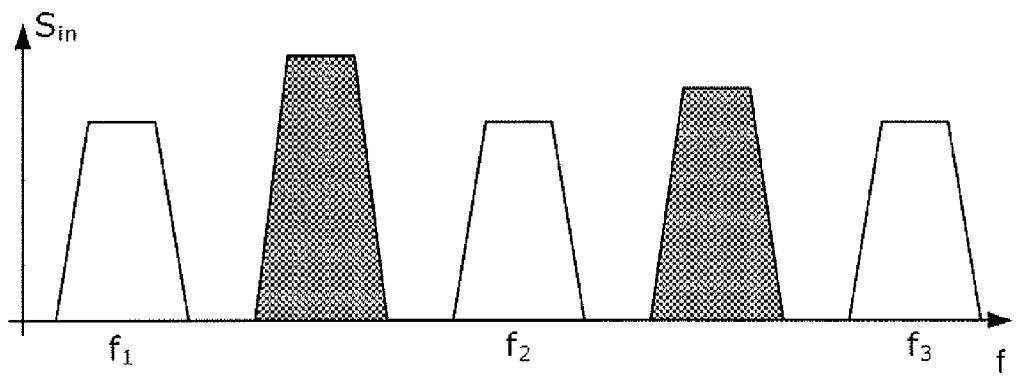
FIG. 13 schematically illustrates an aggregated spectrum.
Figure 14:
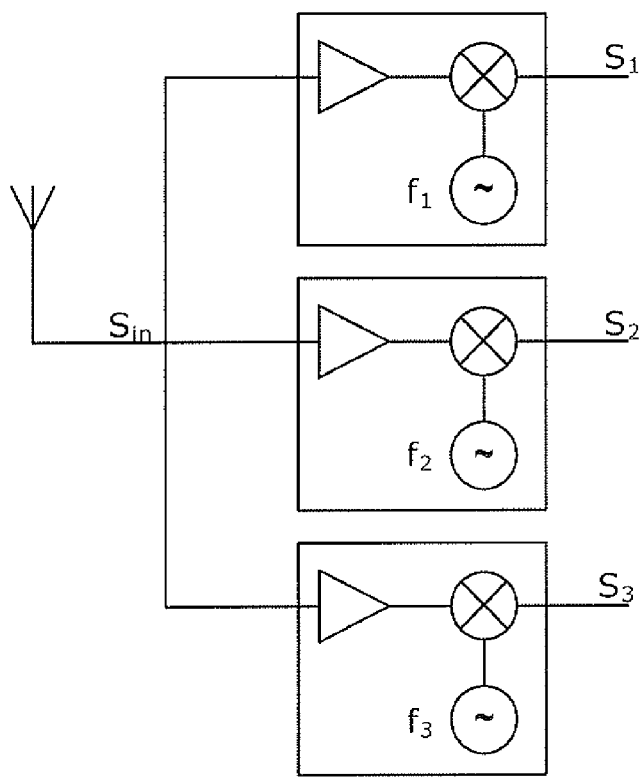
FIG. 14 schematically illustrates a multiple-radio aggregated spectrum radio where a separate front-end receiver handles each sub-band of the aggregated spectrum.
Figure 15:
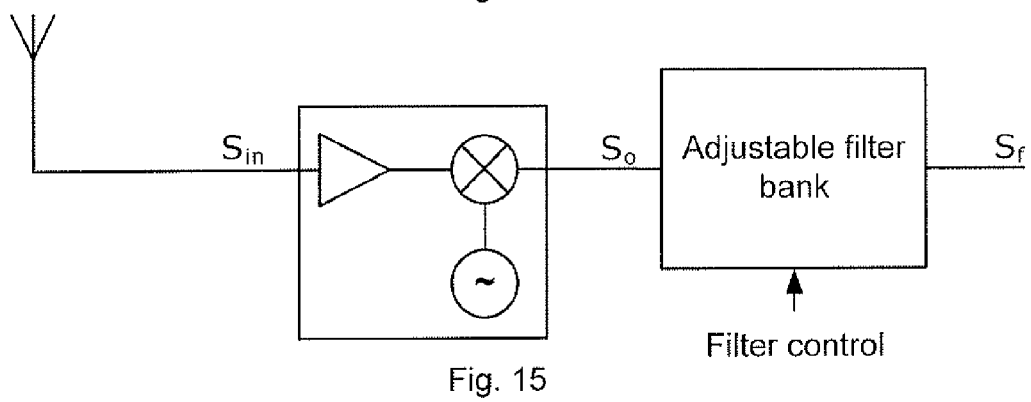
FIG. 15 schematically illustrates the principle of a single-radio aggregated spectrum radio with one front-end receiver for all the sub-bands, and the inventive adjustable filter bank.

FIG. 5 is a very schematic block diagram illustrating a receiver 500 according to embodiments of the present invention. The receiver 500 is what is here referred to as a single radio aggregated spectrum receiver (S-ASR), which is preferably used in a transceiver, e.g. in a terminal arranged to operate in a radio network. For the understanding of the principle, FIG. 13 schematically illustrates an aggregated spectrum, where sub-bands of the aggregated spectrum are present at frequencies $f_1$, $f_2$, $f_3$, while the checkered parts illustrate interspersed blocking interferers. FIG. 14 schematically illustrates a multiple-radio aggregated spectrum radio where a separate front-end receiver handles each sub-band of the aggregated spectrum. FIG. 15 schematically illustrates the principle of a single-radio aggregated spectrum radio with one front-end receiver for all the sub-bands, and an inventive adjustable filter bank, which features has been demonstrated above, and which provides for passing desired sub-bands while blocking interspersed blocking interferers. Returning to FIG. 5, the receiver 500 comprises a front end receiving circuit 502 with programmable filters, e.g. a set-up similar to the one illustrated in FIG. 15, for outputting a desired signal to following stages (not shown), such as e.g. analog-to-digital converter, fast Fourier transformer, detector, demodulator, etc. The front end receiving circuit 502 can comprise a low-noise amplifier, frequency translation circuitry such as mixer or other down-conversion circuitry, etc. The front end receiving circuit 502 receives radio-transmitted signals from one or more antennas 503. The output of the front-end receiver 502 is provided to the following stages, and to a control signal detector 504, which is arranged to detect information about frequency properties, provided via radio from a network node of the radio network, of the aggregated spectrum to be received. For the case that down-conversion is made directly to baseband, the output can be divided into in-phase (I) and quadrature (Q) components. The I and Q signal paths can each have their own filter chains. The control signal detector 504 determines the information about the frequency properties, which can comprise information about where the communication is about to take place within the aggregated spectrum, or positions where indication of presence of interspersed blocking interferers are found. Based on the determined properties, filters are provided in the front-end receiving circuit 502 based on signals indicating center frequency and bandwidth provided from the control signal detector 504 to the front-end receiving circuit 502 to improve selectivity of the receiver.

Figure 6:
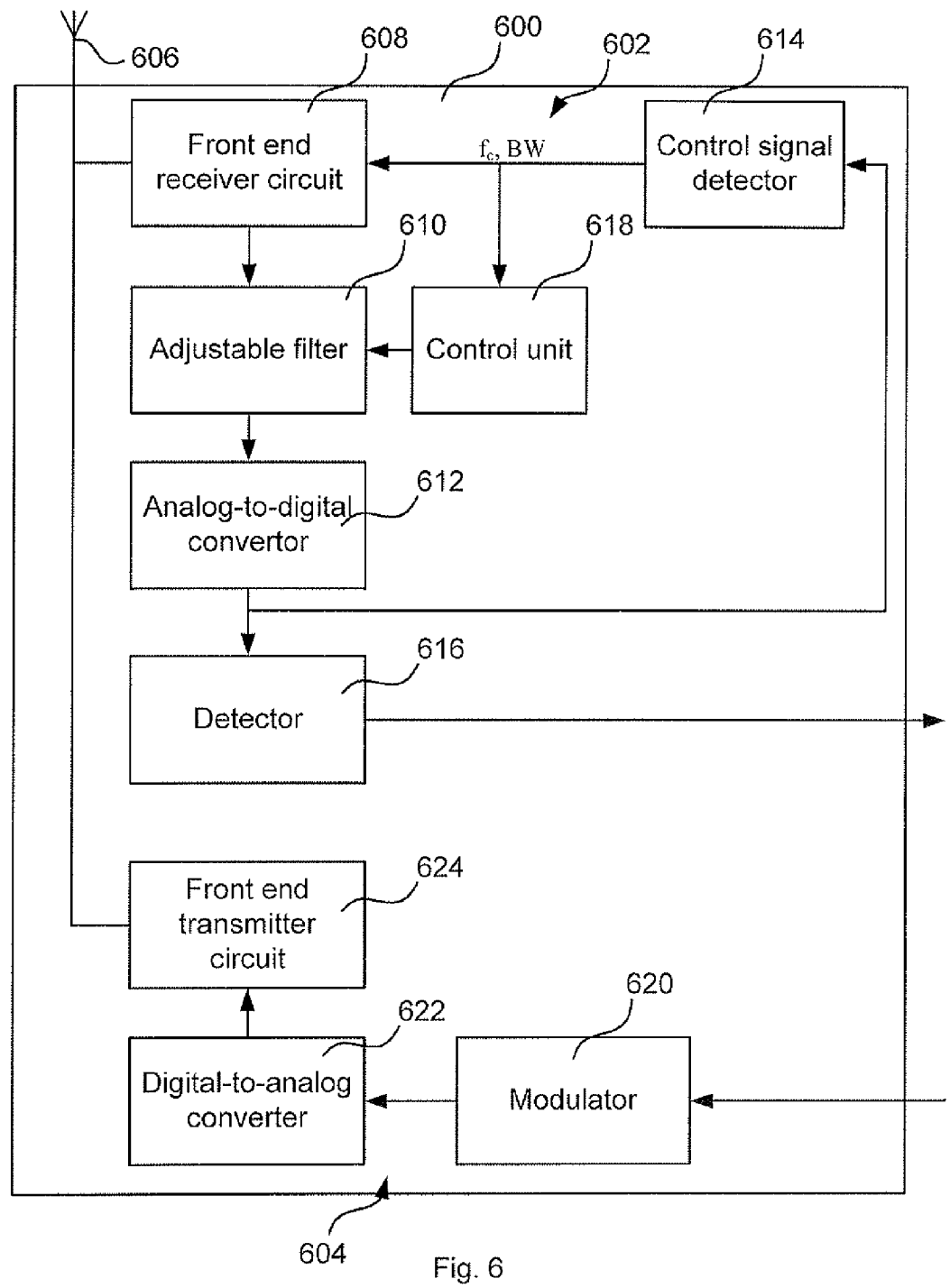
FIG. 6 is a schematic block diagram illustrating a transceiver according to an embodiment of the present invention.

FIG. 6 is a schematic block diagram illustrating a transceiver 600 according to an embodiment of the present invention. The transceiver 600 comprises a receiver 602 and a transmitter 604 connected to one or more antennas 606. The receiver 602 comprises a front end receiving circuit 608 comprising e.g. a low-noise amplifier and mixers (not shown). The receiver further comprises programmable filters 610 arranged in a signal path after the front end receiving circuit 608 for outputting a desired signal to an analog-to-digital converter 612, which provides a digitized signal to a control signal detector 614 and to a detector 616. For the case that down-conversion is made directly to baseband, the output can be divided into in-phase (I) and quadrature (Q) components. The I and Q signal paths can each have their own filter chains. The detector 616 provides its output to following stages (not shown), such as a decoder. The control signal detector 614 is arranged to detect information about frequency properties, provided via radio from a network node of the radio network, of the aggregated spectrum to be received, which is provided to the front end receiving circuit 608 and to a control unit 618 which is arranged to control the programmable filters according to what has been demonstrated above with reference to FIG. 3. The transmitter 604 comprises a modulator 620 which receives information to be transmitted and modulates the information and provides it to a digital-to-analog converter 622, which provides an analog signal to a front end transmitting circuit 624 connected to the one or more antennas 606 for transmitting the information to a network node.

Figure 7:
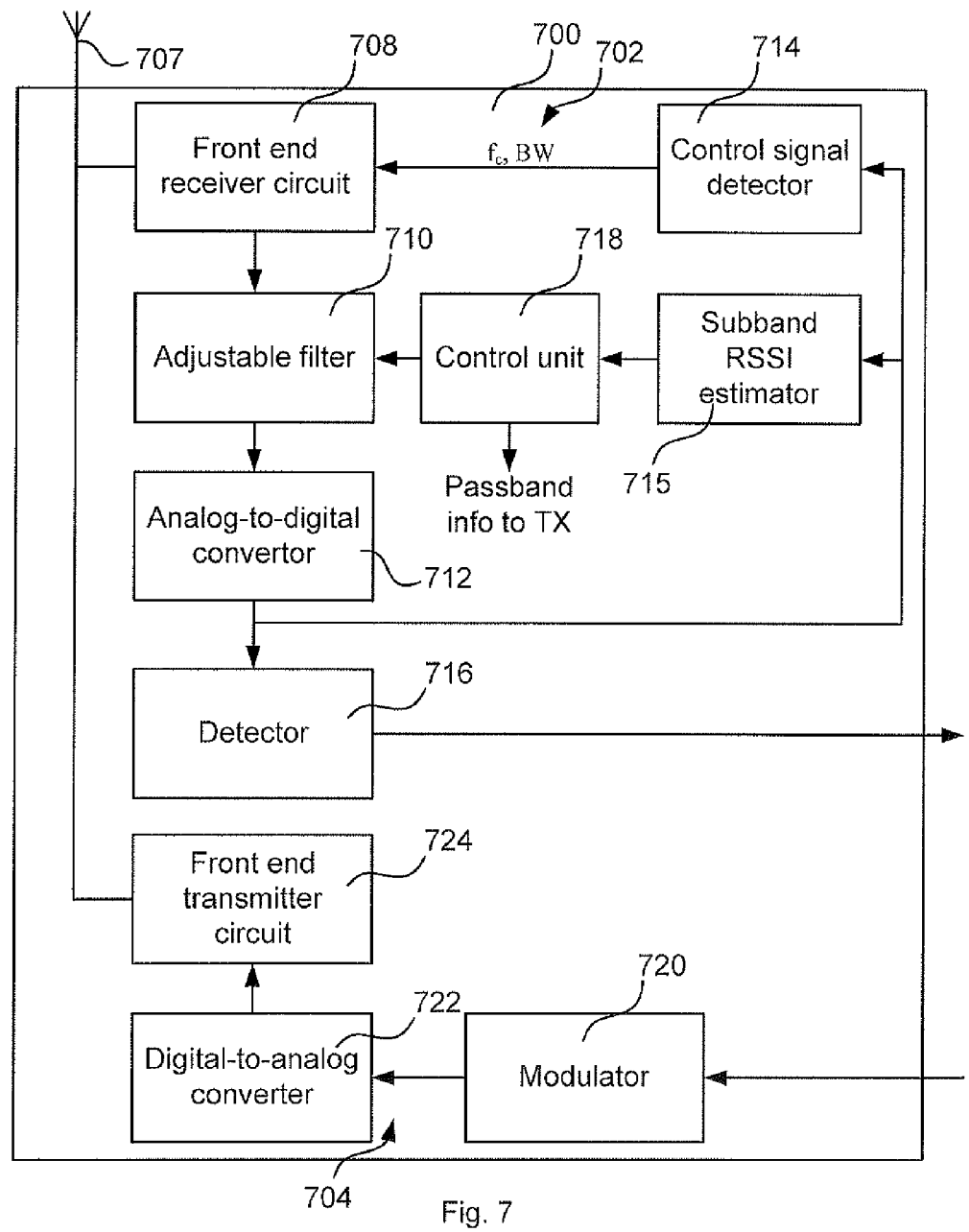
FIG. 7 is a schematic block diagram illustrating a transceiver according to an embodiment of the present invention.

FIG. 7 is a schematic block diagram illustrating a transceiver 700 according to an embodiment of the present invention. The transceiver 700 comprises a receiver 702 and a transmitter 704 connected to one or more antennas 707. The receiver 702 comprises a front end receiving circuit 708 comprising e.g. a low-noise amplifier (not shown). The receiver further comprises programmable filters 710 arranged in a signal path after the front end receiving circuit 708 for outputting a desired signal to an analog-to-digital converter 712, which provides a digitized signal to a control signal detector 714, a sub-band RSSI or SIR estimator 715, and to a detector 716. The detector 716 provides its output to following stages (not shown), such as a decoder. The control signal detector 714 is arranged to detect information about frequency properties, provided via radio from a network node of the radio network, of the aggregated spectrum to be received, which is provided to the front end receiving circuit 708. The sub-band RSSI estimator determines positions in frequency where the input signal is very high, which indicates potential blocking interferers at these positions. Alternatively, the sub-band SIR estimator determines positions in frequency where SIR is low. Estimation can be performed as described with reference to FIG. 2 above. Estimates of the estimator 715 are provided to a control unit 718, which is arranged to control the programmable filters according to what has been demonstrated above with reference to FIG. 2. The control unit 718 can also provide information about pass bands to be used to the transmitter 704, such that the transceiver is able to communicate this to the network node. The transmitter 704 comprises a modulator 720 which receives information to be transmitted and modulates the information and provides it to a digital-to-analog converter 722, which provides an analog signal to a front end transmitting circuit 724 connected to the one or more antennas 707 for transmitting the information to a network node, for example sending information to the network node about the pass bands and signal-to-interference ratio of the pass bands, such that communication between the terminal and the network node is enabled in the aggregated spectrum.

Figure 8:
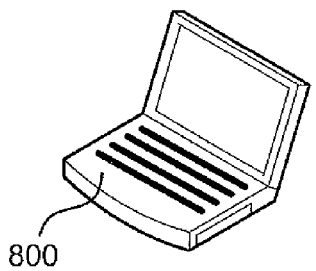
FIG. 8 illustrates a communication terminal according to an embodiment of the present invention.

FIG. 8 illustrates a communication terminal 800 suitable for using a transceiver according to any of the embodiments of the invention. The terminal 800 can be a mobile phone, a portable digital assistant, a laptop computer, a digital camera, or other portable equipment gaining from a less complex receiver for aggregated spectrum reception.

The invention claimed is:

1. A method for a single radio aggregated spectrum receiver of a terminal arranged to operate in a radio network, comprising:
  receiving information on a control signal from a network node of the radio network about frequency properties of an aggregated spectrum to be received;
  determining information about the aggregated spectrum from the received information comprising at least one of presence of one or more blocking interferers interspersed with, and pass bands within the aggregated spectrum; and
  providing one or more filters based on the determined information about the aggregated spectrum such that desired signals are passed and the one or more blocking interferers are attenuated.

2. The method according to claim 1, wherein determining information about the aggregated spectrum comprises estimating frequencies free from blocking interspersed interferers.

3. The method according to claim 1, wherein determining information about the aggregated spectrum comprises receiving information about pass bands within the aggregated spectrum from the network node.

4. The method according to claim 1, wherein the providing of filters comprises assigning a notch filter bank such that the one or more blocking interferers interspersed with the aggregated spectrum are attenuated.

5. The method according to claim 1, wherein the providing of one or more filters comprises assigning a pass band filter bank such that only desired signals of the aggregated spectrum is passed.

6. The method according to claim 1, further comprising sending information to the network node about the pass bands and signal-to-interference ratio of the pass bands, such that communication between the terminal and the network node is enabled in the aggregated spectrum.

7. The method according to claim 1, wherein determining of information about the aggregated spectrum and providing of one or more filters based on the determined information are updated regularly.

8. The method according to claim 1, wherein the one or more filters comprise one or more complex filters.

9. A non-transitory computer readable storage medium having stored therein a computer program comprising computer executable instructions causing a processor to perform a method when executed thereon, wherein the method is for a single radio aggregated spectrum receiver of a terminal arranged to operate in a radio network, and wherein the method comprises:
  receiving information on a control signal from a network node of the radio network about frequency properties of an aggregated spectrum to be received;
  determining information about the aggregated spectrum from the received information comprising at least one of presence of one or more blocking interferers interspersed with, and pass bands within the aggregated spectrum; and providing one or more filters based on the determined information about the aggregated spectrum such that desired signals are passed and the one or more blocking interferers are attenuated.

10. A single radio aggregated spectrum receiver for a terminal arranged to operate in a radio network, comprising:

a front end receiving circuit comprising programmable filters; and a control signal detector arranged to detect received information on a control signal from a network node of the radio network about frequency properties of an aggregated spectrum to be received, and determine information about the aggregated spectrum from the received information comprising at least one of presence of one or more blocking interferers interspersed with, and pass bands within the aggregated spectrum, such that the programmable filters are set based on the determined information about the aggregated spectrum such that desired signals are passed and the one or more blocking interferers are attenuated.

11. The receiver according to claim 10, wherein the control signal detector further is arranged to estimate frequencies free from blocking interspersed interferers such that information about the aggregated spectrum is determined.

12. The receiver according to claim 10, wherein the control signal detector further is arranged to receive information about pass bands within the aggregated spectrum from the network node such that information about the aggregated spectrum is determined.

13. The receiver according to claim 10, wherein the programmable filters are configured to a notch filter bank such that the one or more blocking interferers interspersed with the aggregated spectrum are attenuated.

14. The receiver according to claim 10, wherein the programmable filters are configured to a pass band filter bank such that only desired signals of the aggregated spectrum is passed.

15. The receiver according to claim 10, further comprising a transmitter arranged to send information to the network node about the pass bands and signal-to-interference ratio of the pass bands, such that communication between the terminal and the network node is enabled in the aggregated spectrum.

16. The receiver according to claim 10, being arranged to determine information about the aggregated spectrum and update filters based on the determined information regularly.

17. The receiver according to claim 10, wherein the programmable filters comprise complex filters.

18. A terminal for operation in a radio network, comprising a receiver according to claim 10.

19. The terminal according to claim 18, being a mobile phone, a portable digital assistant, a laptop computer, or a digital camera.

* * * * *